United States Patent Office 2,830,999
Patented Apr. 15, 1958

2,830,999

PHTHALIDES

Donald D. Wheeler and David C. Young, Midland, Mich., assignors to The Dow Chemical Company, Midland, Mich., a corporation of Delaware No Drawing. Application April 30, 1956
Serial No. 581,287

5 Claims. (Cl. 260—343.3)

This invention is concerned with phthalides having the formula

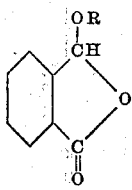

In this and succeeding formulae, R represents a radical selected from the group consisting of chloroalkyl and nitroalkyl.

These new compounds are amber colored oils or light colored solids and are soluble in many organic solvents such as benzene, toluene and acetone and are of very low solubility in water. They have utility as microbicides and are adapted to be employed for the control of bacterial organisms.

These novel compounds may be prepared by causing phthalaldehydic acid to react with an appropriate hydroxy compound having the formula

ROH to obtain the desired phthalide and water of reaction. The terms "phthalaldehydic acid" and "3-hydroxyphthalide" refer to a compound having the structure

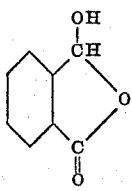

Phthalaldehydic acid is often represented in the literature as having the structure

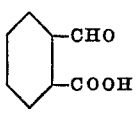

However, the acid employed in this invention and prepared as hereinafter described exists almost entirely in the closed ring 3-hydroxyphthalide structure as observed from a study of its infrared spectrum. Infrared data also indicate the phthalide product to have the closed ring 3-hydroxyphthalide structure with the open chain ester sometimes being formed as a by-product.

In the synthesis, good results are obtained when substantially equimolar proportions or an excess of either reactant are employed. However, phthalaldehydic acid, if used in large excess or under conditions of high temperature, may form an anhydride by-product. The reaction takes place smoothly in the temperature range of from 15° to 150° C. but a range of from 90° to 130° C. is considered preferable from a practical standpoint such as rate of reaction or convenience of operation. Solvents such as benzene, diethyl ether and toluene may be employed as reaction medium, if desired. The product obtained may be separated from the water of reaction by vaporization of the latter.

In a preferred method of carrying out the reaction, phthalaldehydic acid and an equimolar proportion or an excess of the appropriate hydroxy compound are mixed and heated until the water of reaction begins to reflux, and maintained under reflux from 0.5 to 7 hours. The solution is allowed to cool and then poured into water whereupon an insoluble oil or solid precipitates. The water is decanted from the oil or solid product and the latter washed with warm water. The product, if a liquid, is dissolved in benzene and the resulting solution heated to distill first any residual water as a benzene-water azeotrope and then the solvent to obtain the desired product as a residue. The product, if a solid, is filtered from the aqueous mixture and may be washed with a solvent such as methyl ethyl ketone or recrystallized from such solvent.

The following examples illustrate the invention but are not to be construed as limiting.

*Example 1.—3-(2-chloroethoxy)phthalide*

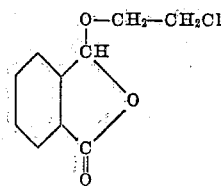

40.26 grams (0.5 mole) of ethylene chlorohydrin and 75 grams (0.5 mole) of phthalaldehydic acid were mixed and heated to about 110° C. and maintained under reflux for three hours. The solution was cooled and poured into 500 milliliters of water to obtain a 3-(2-chloroethoxy)phthalide product as an oily precipitate. The water was decanted from the oil, the latter washed with water and then dissolved in benzene. The resulting mixture was heated to distill the water as a benzene-water azeotrope and then the solvent and to recover a purified product as a residue. The latter was an amber-colored oil and was obtained in a yield of 66 grams or 68.5 percent of theoretical. The product had a refractive index $n_D^{20}$ of 1.5473.

*Example 2.—3-(2-methyl-2-nitropropoxy)phthalide*

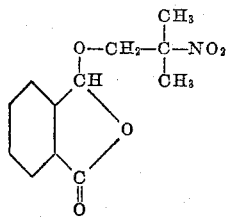

59.5 grams (0.5 mole) of 2-methyl-2-nitro-1-propanol and 75 grams (0.5 mole) of phthalaldehydic acid were mixed and heated to 130° C. and maintained under reflux for two hours. The resulting solution was cooled and poured into 600 milliliters of water to obtain a 3-(2-methyl-2-nitro-propoxy)phthalide product as an oil. The latter solidified on standing and was filtered, washed and dried in the temperature range of from 45° to 55° C. at 15 millimeters pressure to obtain a solid melting from 50° to 55° C. The product amounted to 67 grams or 53 percent of theoretical.

*Example 3.—3-(2,2,2-trichloro - 1,1 - dimethyl - ethoxy) phthalide*

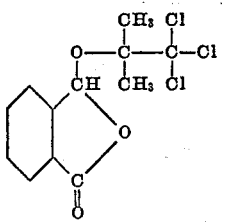

46.6 grams (0.25 mole) of chloretone hemihydrate, melting at 80°–81° C., and 37.5 grams (0.025 mole) of phthalaldehydic acid were mixed and heated to and maintained in the temperature range of from 120° to 130° C. under reflux for five hours. The solution was cooled and poured into 600 milliliters of water whereupon a solid precipitate of a 3-(2,2,2-trichloro - 1,1 - dimethylethoxy) phthalide product formed. The latter was filtered and dried to obtain a solid melting from 70° to 110° C. After recrystallization from acetone, the product melted at 131°–133° C.

The products of this invention are effective as germicides and may be employed for the control of bacterial organisms. In a representative operation, 3-(2-chloroethoxy) phthalide was added to bacteriological media to give a concentration of 0.5 percent and the media inoculated with *Staphylococcus aureus* and incubated at 30° C. for four days. At the end of this period, complete inhibition of growth of the test organism was observed.

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene is then heated with an aqueous solution containing from 4 to 35 percent by weight of a metal halide such as ferric chloride to obtain phthalaldehydic acid, as more fully disclosed and claimed in a copending application of James D. Head and Owen D. Ivins, Serial Number 279,682, filed March 31, 1952, now Patent No. 2,748,162.

We claim:
1. A phthalide having the formula

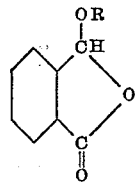

wherein R represents a radical selected from the group consisting of chloroalkyl and nitroalkyl containing from 2 to 4 carbon atoms, inclusive.

2. 3-(2-chloroethoxy) phthalide.
3. 3-(2-methyl-2-nitropropoxy) phthalide.
4. 3-(2,2,2-trichloro-1,1-dimethylethoxy) phthalide.
5. A method for preparing a phthalide having the formula

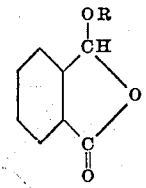

wherein R represents a radical selected from the group consisting of chloroalkyl and nitroalkyl containing from 2 to 4 carbon atoms, inclusive, which comprises the step of heating phthalaldehydic acid and a hydroxy compound having the formula, ROH, wherein R is as above defined, at a temperature of from 90° to 130° C. for a time sufficient to allow completion of the reaction.

References Cited in the file of this patent

Grove: Biochem. J., 54, pp. 664–73 (1953).
Auwers et al.: Berichte 52, pp. 587, 596 (1919).
Kohlrausch et al.: Berichte 77, p. 471 (1944).
Racine: Annalen, vol. 239, p. 83 (1887).